United States Patent [19]

Ramey

[11] Patent Number: 5,135,400

[45] Date of Patent: Aug. 4, 1992

[54] VIVARIUM FOR ECOSYSTEM TEACHING PURPOSES AND RECREATIONAL OBSERVATION

[76] Inventor: Victor A. Ramey, Rte. 1, Box 217A, Micanopy, Fla. 32667

[21] Appl. No.: 860,178

[22] Filed: Mar. 30, 1992

[51] Int. Cl.5 .................... G09B 23/00; A01K 63/00; A01K 1/02
[52] U.S. Cl. ........................ 434/297; 119/5; 119/19; 434/295
[58] Field of Search .............. 434/295–297; 119/5, 19; 47/69

[56] References Cited

U.S. PATENT DOCUMENTS

| | | | |
|---|---|---|---|
| 2,491,853 | 12/1949 | Feldman | 119/5 |
| 3,699,921 | 10/1972 | Janicek | 119/5 |
| 3,786,781 | 1/1974 | Poulsen | 119/5 |
| 3,804,064 | 4/1974 | Kuneman | 119/5 |
| 4,176,620 | 12/1979 | Kassos | 119/5 |
| 4,754,571 | 9/1986 | Riechmann | 119/5 |
| 4,788,938 | 12/1988 | Davenport | 119/5 |
| 4,850,306 | 7/1989 | Nitkin | 119/17 |
| 4,995,334 | 2/1991 | Wechsler | 119/5 |

*Primary Examiner*—Gene Mancene
*Assistant Examiner*—L. Thomas

[57] ABSTRACT

An enclosure to provide aquatic, amphibious and terrestrial plants and animals and flying animals with a natural environment that prevents escape. In one embodiment, an aquatic area and terrestrial area are connected by way of two ramps, so that animals may go back and forth between water and land. The aquatic and terrestrial areas are able to be drained through bottom outlets. The upper part of the enclosure confines an air zone in which flying animals may fly above and land in the water and land zones. The upper part of the enclosure has side and top openings covered by panels. At least one of the side panels is openable. In the preferred embodiment, the panels are covered with screen, however, they may be covered with glass or plastic.

18 Claims, 2 Drawing Sheets

VIVARIUM FOR ECOSYSTEM TEACHING PURPOSES AND RECREATIONAL OBSERVATION

FIELD OF INVENTION

This invention relates to natural sciences observation and teaching devices such as aquariums, terrariums, and vivariums. This invention is an improvement which permits aquatic and terrestrial plants and animals, and aerial animals to coexist and interact in a single enclosure, and permits teachers and others to demonstrate environmental science lessons that require water, land and air.

BACKGROUND AND DESCRIPTION OF PRIOR ART

Most elementary school teachers have not yet recognized the need for a single device for educational activities to demonstrate the complexities of ecosystem functioning, such as how plants and animals grow and live with each other, and how they interact with parts of the environment. Yet, legislation now requires that teachers teach concepts about total ecosystem functioning, not merely how plants and animals grow individually.

Heretofore, teachers and others have had no devices to demonstrate adequately these ecosystem complexities under approximately natural conditions. Instead, they have been compelled to "make do" with small containers such as glass aquariums, plastic milk or soda bottles, cups, saucers, or cages to grow plants and animals.

Small separate containers do not function for long-term observations and measurements (data collection) of natural phenomena for classroom environmental science education activities. Such containers may sometimes be suitable for observing the growth of a pea plant, or to watch a few guppies have babies, or to watch a gerbil use an exercise wheel. However, such "make do" containers cannot be used to demonstrate meaningfully natural interactions among and between plants and animals, or interactions between them and parts of their environment.

Small containers are inadequate for science and environmental teaching activities for at least four reasons. First, they are not big enough. An environmental teaching device must have enough room for several specimens of several species, and include aquatic and terrestrial plants and animals, and flying animals such as insects.

Secondly, with separate containers there can be no assured species movement (interchange) between the containers. Natural ecosystems, on the other hand, have many types of species freely occupying and moving about in the same area.

Thirdly, separate containers have either dirt or water. However, a science teaching device must have significant water and land zones large enough to support aquatic and terrestrial plants and animals and amphibians. In addition, animals must be able to move freely between the aquatic and terrestrial zones, especially if they are amphibious.

Fourthly, the individual containers used by teachers are not designed to include flying animals such as dragonflies, butterflies and other insects which are integral parts of the natural environment and should be integral parts of science education activities. An enclosure is needed that has enough room for small flying animals to actually fly about and choose to land in aquatic or terrestrial areas.

Containers which have air-impermeable sides and bottoms such as traditional glass or plastic aquariums and terrariums, cannot be used to demonstrate natural ecosystem functioning. These containers do not allow free air movement and heat exchange. The interiors become too hot for normal plant and animal functioning, and often too hot for life. What is needed is an enclosure whose sides allow for free air movement and heat exchange.

Glass-bottom containers also cannot be properly drained or set up for soil-saturation or evaporation/transpiration activities. That is because glass-bottom containers such as aquariums and terrariums do not have a means for bottom draining. What is needed is an enclosure that has a means for bottom draining.

In addition, the interiors of glass-sided containers are accessible only from the tops, making them less efficient for teaching purposes, and making it difficult to reach the biological specimens at the bottom. What is needed are openable or removable access panels on the sides as well as the top. Side access panels make a habitat enclosure much easier to set up, maintain, manipulate and clean.

Glass-sided containers also present a safety problem, in that children leaning on the sides may break the glass and become injured. Therefore, children are often told to remain at arms length from the glass containers, thus defeating the educational and observational purposes of the containers. What is needed is an enclosure made of a material other than breakable glass.

Heretofore, aquariums have housed aquatic animals; terrariums and vivariums have housed terrestrial animals. Aquariums have provided sufficiently for certain aquatic plants and animals. Likewise, terrariums have provided sufficiently for certain terrestrial plants and animals. A limited number of designs have attempted to combine aquariums and terrariums. However, a search of the prior art demonstrates that no design provides for the free interaction of terrestrial, aquatic and aereal animals in conditions which approximate the natural environment. The majority of previous inventions which combine terrariums and aquariums have separated—not integrated—terrestrial and aquatic areas. None provide from the containment of aereal animals. Therefore, the free association among all types of animals is not possible within these designs. And these designs, in many cases, actively prevent the environment from changing, as natural environments change over time.

As for turtles and amphibians, which require aquatic and terrestrial living areas, devices have been designed such as special aquariums, U.S. Pat. Nos. 4,995,334, 3,786,781, 3,804,064 and 4,176,620. A floating shoreline has also been patented, U.S. Pat. No. 4,788,938. Each of the above may be said to provide sufficiently for turtles and amphibians in that the animals can actually remove themselves from the water. However, removing themselves from the water is only one essential activity of these animals. These devices do not enable the animals to act naturally once they get out of the water: for example, it would be difficult or impossible for a turtle to lay eggs in the artificial substrate or to climb into a potted plant to lay eggs, as they would have to do in U.S. Pat. No. 4,788,938, or to lay eggs in the biologically unsuitable totally saturated mud of U.S. Pat. No.

4,176,620. Another device, U.S. Pat. No. 4,754,571, which is disclosed to be an aquarium/terrarium/humidifier, might be used to provide for turtles and amphibians, except that the flat vertical wall separating the water and land does not have a sloping shelf so that animals could hoist themselves and crawl onto the land.

As for terrestrial plants, glass or plastic aquariums and terrariums of the prior art are inadequate for natural reproduction and growth. If soil is applied to the bottom and plants are planted in it, they eventually die. This is because the bottom cannot be drained after water is applied, so the soil and root zones become saturated, eventually drowning the plants, or giving rise to allelopathic algae, fungus and bacteria which kill the plants. Alternatively, if the plants are placed in pots inside the terrarium, then the plants cannot vegetatively reproduce and spread. Also their roots become constricted, stunting plant growth.

As for aquatic plants, devices of the prior art do not provide for various growth depths required of different submersed and emersed aquatic plants. Different species require different water levels for reproduction and growth. Aquariums of the prior art contain only submersed plants, which represent only a small percentage of aquatic plants.

As for terrestrial animals, devices of the prior art do not give them a constant source of drinking water which cannot spill or which do not require frequent re-filling, nor does the prior art include pools large enough to accomodate terrestrial animals that swim, nor does the prior art provide water areas for prey-predator relationships wherein terrestrial animals hunt for prey along side and in pools of water.

As for flying animals such as large flying insects, no prior art provides for all life stages. Life stages for different flying insect species cannot be accomodated in previous aquariums or terrariums or combinations thereof. Life stages for various species require dirt, terrestrial plants, water, aquatic plants, and of course air to fly in. As one example, dragonflies have several growth stages, from eggs to aquatic larvae to pupae to adult flyers. A device to accomodate them would require a pool of water for egg-laying and growth of larvae and pupae, emersed plants for pupae attachment and metamorphosis, and of course a suitable volume of air for adult flying and for their prey. Other species such as ant lions have aquatic larvae, terrestrial pupae and aerial adults. A device for them would require water, land and air.

As for natural interaction among many species of different ecological zones (air, land, water), the prior art makes inadequate provision. The prior art provides for certain life stages of certain plants and animals, but none provides an environment for all life stages of small aquatic, terrestrial, amphibious and aerial plants and animals. It also would be very difficult to demonstrate natural interactions such as cross-pollination by flying insects in the cramped confines of the devices of the prior art.

In the field of the prior art, no invention overcomes the above described short-comings.

OBJECTS AND ADVANTAGES OF THE PRESENT INVENTION

It is the principal object of the present invention to overcome the above described short-comings of the prior art. The present invention provides a single enclosure to provide for the normal reproduction, growth and interaction of aquatic, amphibious and terrestrial plants and small animals, and small flying animals.

The advantage is that the complex interrelationships of nature can occur, and can be observed over time, and can be altered so that the effects of the alterations can be observed.

Another object of the present invention is to provide a habitat that more closely parallels the natural environment by providing for free airflow and bottom drainage.

The advantage is that temperature and other air changes that naturally occur outside the enclosure will also occur inside the enclosure. The advantage of bottom draining is that there is no need to place plants in drainable pots inside the enclosure; plants may naturally spread and grow.

Another object of the present invention is to provide teachers, students and others a self-contained ecosystem device for easily manipulating, observing and studying natural interactions among plants and animals and their environment.

The advantage is that the functions of many separate containers which rear different plants and animals are combined into one enclosure.

Another object of the present invention is to provide a habitat that is easy to maintain. The openable or removable side panels of the enclosure make it possible to reach all interior parts of the enclosure.

Other objects of the present invention are to provide a habitat that is simple in design and inexpensive to manufacture.

SUMMARY OF THE INVENTION

The present invention comprises an enclosure, the bottom part of which is partitioned, as in a combination aquarium/terrarium. Each bottom partitioned area is capable of retaining water, soil or other media. Each partitioned area may also be drained through bottom outlets. Filtering, pumping and other equipment may be mounted to an exterior wall of any partitioned area.

A means is provided for small animals to be able to walk, crawl or hop between partitioned areas. In the example where one partition contains water and another contains soil, the means could be a ramp or tube that in one partition terminates in the soil, while the other terminus forms a shelf submerged in the water. In this way, animals may move freely back and forth between terrestrial and aquatic environments.

The upper part of the overall enclosure confines an air space in which flying animals may fly without escaping. The flying animals may alight in any partitioned area, or in other embodiments may be confined to certain air zones by means of interior panels. The exterior walls of the upper part of the enclosure contain openable panels on the sides and on the top. The panels may be covered with screening, plastic or glass, depending on the needs of the user. The panels prevent free-flying animals from escaping the enclosure, they permit unobstructed observation of the enclosure's interior, and they permit access to the enclosure's interior, including access to the partitioned areas.

DETAILED DESCRIPTION OF THE PREFERRED EMBODIMENT

Figure 1:
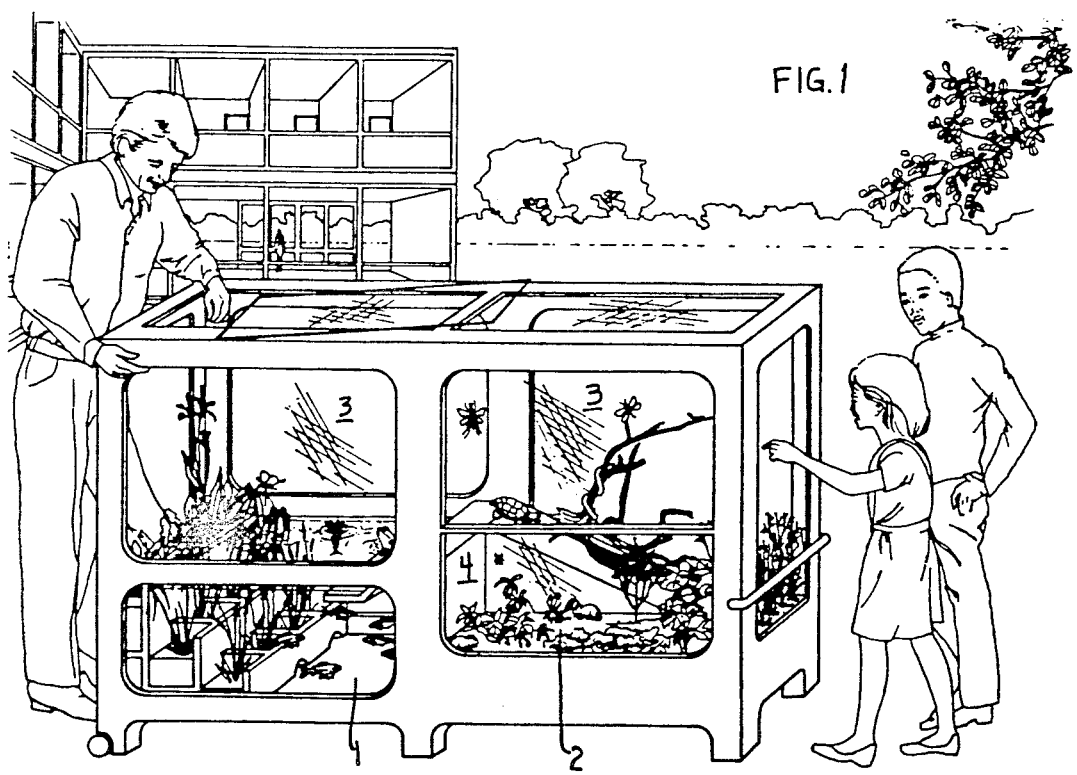
FIG. 1 is a perspective view of one embodiment of the present invention in operation.

Referring to FIG. 1, the invention contains aquatic, terrestrial and amphibious plants and animals, and flying insects. The rectangular shaped enclosure is probably the most practical shape and is shown for purposes of disclosure. However, the invention may be embodied as a partitioned circular container on the bottom with an umbrella-shaped top and sides. An enclosure of any shape may employ the principles described by the present invention.

The basic structure and interior parts of the enclosure are made of any suitable material, but water proof molded plastic is preferred. It is believed that the plastic used can be recycled plastic.

Figure 2:
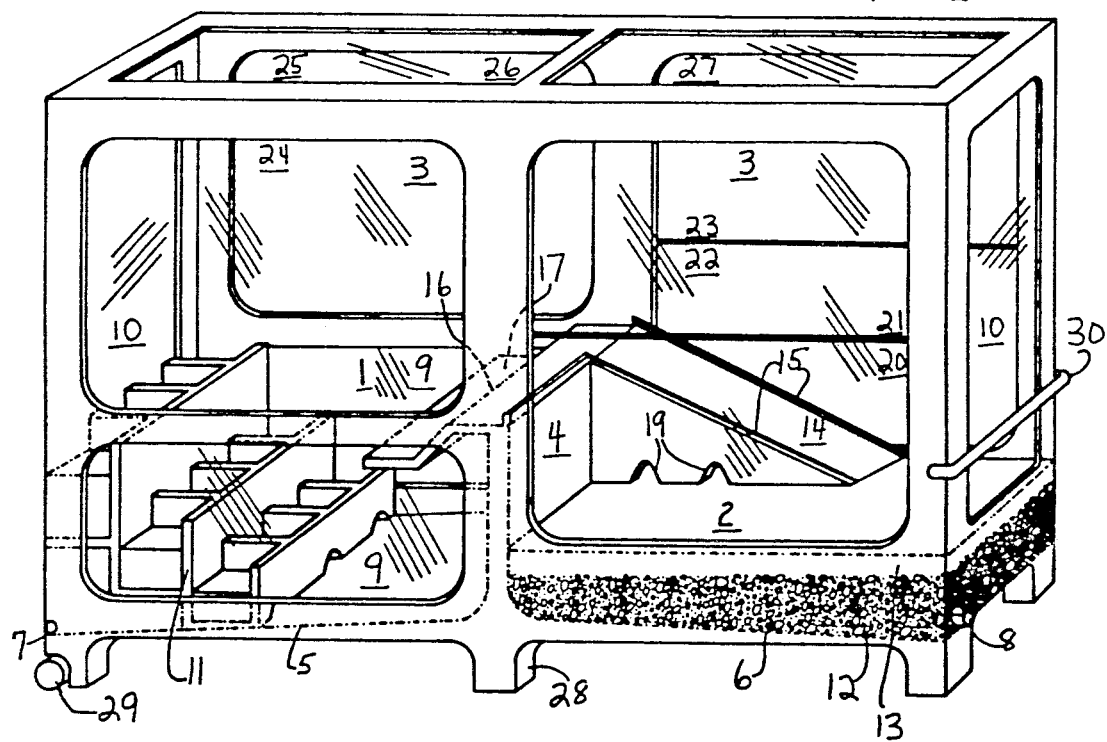
FIG. 2 is a cutaway view of the preferred embodiment of the present invention.

Referring to FIG. 2, the enclosure shown contains two partitioned areas in the bottom part: aquatic zone 1, and terrestrial zone 2. The upper part of the invention confines the aerial zone 3. The aquatic and terrestrial zones are bounded by the walls of the enclosure and a partition member 4. The partitioned areas are capable of retaining water, soil or other media. The present configuration was chosen for purposes of disclosure. However, there could be more than two partitioned areas in the bottom part of the invention. Likewise, the aerial zone 3 is disclosed as a single space, however internal panels could further divide the aerial zone.

The aquatic zone 1 and terrestrial zone 2 each have sloping bottoms 5 and 6 to bottom drain outlets 7 and 8.

The aquatic zone 1 has windows 9 imbedded into the exterior walls of the invention to facilitate underwater viewing. The windows is made of glass or plastic and is inserted into the enclosure walls and attached by means of waterproof silicon seal. The width end of aquatic zone 1 is a glass or plastic window 10 which spans as much as is structurally possible from below the water line to the top of the invention. The window 10 is practically the entire width end of the aquatic zone 1.

The aquatic zone 1 includes a planting structure 11 which comprises a plurality of soil and plant containers. The planting structure 11 supports the containers at different levels so that when placed in a partitioned area containing water, the containers are held at different water depths. The planting structure 11 enables the planting and growth of aquatic plants that prefer different water depths.

The terrestrial zone 2 is bounded by the exterior walls of the enclosure and by a partition member 4 to a height that permits retaining one or more inches of drain pebbles 12 and four or more inches of dirt, sand, hydroponic beads or other media 13. In other embodiments of the invention, partitioned areas may contain only one media so that partitioned areas may contain water or dry media, depending on the needs of the user. The width end of terrestrial zone 2 is a glass or plastic window 10 which spans as much as is structurally possible from the top of the dry media to the top of the invention. The window 10 is practically the entire width end of the terrestrial zone 2.

An animal-access means is provided for small animals to be able to walk, crawl or hop between partitioned areas. In this embodiment, a removable sloping animal ramp 14 terminates at one end flush with the non-water media of the terrestrial zone 2. The sloping animal ramp 14 has two ridges 15 on either edge of the length of the ramp, said ridges being high enough to discourage animals from falling off said animal ramp 14. The sloping animal ramp 14 gives animals access to another sloping ramp 16 and submerged shelf structure 17. Sloping ramp 16 and submerged shelf 17 are molded as part of the top of partition member 4. The sloping ramp 16 begins at the top of partition member 4, slopes into the aquatic zone 1 and terminates as the submerged shelf structure 17 that is in the water of aquatic zone 1. The water level in aquatic zone 1 is maintained so that the submerged shelf structure 17 is deep enough for turtles, frogs, newts and other small animals to swim onto it. From the submerged shelf structure 17, animals can move themselves up the sloping ramp 16 of partition member 4, over to the top of the sloping animal ramp 14, and down the ramp into the terrestrial zone 2.

The sloping animal ramp 14 also contains two animal houses in its base. Each animal house is simply a partitioned area of the hollow understructure of the sloping animal ramp 14. Each animal house has a base-level opening 19 that allows animals to move from the land zone into the animal house. However, it should be understood that in other embodiments there may be none, one or several animal houses in the base of the sloping animal ramp 14.

The upper part of the overall enclosure confines the air zone 3. The air zone is large enough for small flying animals to fly about in. In this embodiment, the air zone is not partitioned, and flying animals may alight in either the water zone or the terrestrial zone. However, in other embodiments permanent or removable interior partitions may be added to divide the air zone and confine flying animals to particular areas. For example, an interior partition, not shown, may be added perpendicularly above partition member 4.

The exterior walls of the upper part of the enclosure contain cutout openings on the sides and on the top. The cutout openings, except for width-end windows 10, are completely covered with panels 20-27 which may be opened or removed. The panel frames are made of a suitable material. In the case of the preferred embodiment, the panel frames are made of aluminum or other light, rigid material. In the preferred embodiment, the panels are inserted into the openings and are held in place by attachment means such as small finger-twist flanges.

The panels 20-27 themselves may be of any material that prevents small animals from passing through. Panel material may be screening, glass or plastic, depending on the needs of the user. In the case of the preferred embodiment, the panel material is metal screening whose mesh size is small enough to prevent insects from escaping. The panels serve three purposes: to prevent free-flying and other animals from escaping the enclosure, to permit free observation of the enclosure's interior, and to permit access to the enclosure's interior, including access to all partitioned areas. The screened panels of the preferred embodiment serve a fourth purpose as well, namely to allow air exchange between the interior and exterior of the invention. Free air exchange helps prevent the temperature of the interior of the invention from becoming unnaturally hot. Unnaturally hot conditions in the interior would affect plant and animal health and could cause plant and animal death.

The invention also includes a plurality of legs 28 of equal length extending below and at right angles to the bottom surface of the exterior of the enclosure. The legs 28 lift the invention above the floor so that viewing and use is facilitated, so that maintenance is facilitated, and so that moving the invention is facilitated.

Two or more of the legs 28 of this embodiment of the invention also include wheels 29 attached at floor level to facilitate moving the invention. The wheels of the preferred embodiment have a means for retraction (not shown) so that the wheels 29 may be lowered to the floor to facilitate moving the invention, or may be retracted above the floor when the invention is to stay in place.

The invention also includes a rigid and strong handle 30 which is attached horizontally across the exterior width of terrestrial zone 2 of the invention. The handle 30 facilitates moving the invention and may be used for lifting, pushing and pulling the invention.

I claim:

1. In combination, to provide habitat for small aquatic, amphibious and terrestrial plants and animals and for flying animals:
   (a) an enclosure having a bottom, sides and a top;
   (b) the bottom part of said enclosure having a plurality of partitioned areas capable of retaining water, soil or other media;
   (c) the partitioned areas each having a means for draining;
   (d) said enclosure having animal-access means by which small animals are able to move themselves back and forth between partitioned areas;
   (e) the upper part of said enclosure confining an air space large enough for small flying animals to fly about in;
   (f) the upper part of said enclosure having a plurality of openings in the sides and in the top;
   (g) the upper part of said enclosure having a plurality of panels of sizes sufficient to completely cover the openings in the sides and in the top;
   (h) the sides and top having means for attaching said panels over the openings so that the openings are completely covered;
   (i) the panels being made of materials that prevent small animals from passing through;
   (j) means for attachment for at least one side panel wherein at least one side panel may be nondestructively opened or removed.

2. The enclosure of the invention of claim 1 wherein said enclosure is made of plastic.

3. The partitioned areas of the invention of claim 1 wherein the bottom surfaces of said partitioned areas slope toward drain outlets.

4. The partitioned areas of the invention of claim 1 wherein the exterior walls of said partitioned areas contain one or more leakproof viewing windows positioned below the water line.

5. The animal-access means of the invention of claim 1 wherein said animal-access means allow animals to walk, crawl or hop between areas containing soil, water or other media.

6. The animal-access means of claim 5 wherein the non-water side of the animal-access means is a sloping ramp that terminates flush with the non-water media.

7. The animal-access means of claim 6 wherein the sloping ramp include ridges along the lengths of both edges.

8. The animal-access means of claim 5 wherein the water side of the animal-access means is a second sloping ramp that terminates in a submerged shelf structure.

9. The animal-access means of claim 5 wherein the bottom part of the non-water side of the animal-access means contains one or more animal houses.

10. The animal houses of claim 9 having openings on the interior part of the base of the animal-access means.

11. The panels of the invention of claim 1 wherein said panels are covered with screening, glass or plastic.

12. The invention of claim 1, further including a means for containing soil and aquatic plants at various water depths.

13. The means for containing soil and aquatic plants at various water depths of claim 12 wherein said means is a single unit supporting a plurality of containers at different levels.

14. The invention of claim 1, further including a plurality of legs of equal length extending below and at right angles to the bottom of said enclosure.

15. Said plurality of legs of claim 14 further including wheels attached at the bottoms.

16. Said wheels of claim 15 having a means for retraction above the floor surface.

17. The invention of claim 1, further including a handling means.

18. Said handling means of claim 17 wherein said handling means is a handle horizontally attached to one side.

* * * * *